United States Patent [19]

Votocek

[11] 4,038,202
[45] July 26, 1977

[54] PROCESS FOR ELUTION OF ACTINIDE METAL MICROSPHERES

[75] Inventor: Otakar Votocek, Arnhem, Netherlands

[73] Assignee: Reactor Centrum Nederland (Stichting), The Hague, Netherlands

[21] Appl. No.: 407,225

[22] Filed: Oct. 17, 1973

Related U.S. Application Data

[63] Continuation-in-part of Ser. No. 284,063, Aug. 28, 1972, abandoned.

[30] Foreign Application Priority Data

Aug. 26, 1971 Netherlands ............... 7111737

[51] Int. Cl.$^2$ .................................... G21C 3/62
[52] U.S. Cl. ............................. 252/301.1 S; 264/.5
[58] Field of Search ............ 252/301.1 S, 448, 559; 423/260; 264/.5

[56] References Cited

U.S. PATENT DOCUMENTS

| 2,878,100 | 3/1959 | Googin, Jr. ............... 423/260 |
| 3,290,122 | 12/1966 | Clinton et al. ........... 252/301.1 S |
| 3,367,881 | 2/1968 | Morse ....................... 252/301.1 S |
| 3,397,257 | 8/1968 | Brambilla et al. ........ 252/301.1 S |
| 3,586,742 | 6/1971 | Chin et al. ................ 252/301.1 S |
| 3,669,632 | 6/1972 | Kanij et al. .............. 252/301.1 |

OTHER PUBLICATIONS

Chem. Abstracts No. 70:98067v.
Griffen, W.C., "Classification of Surface Active Agents by HLB," Journal of the Society of Cosmetic Chemists, vol. 1, (1949), pp. 311–326.
Griffen, W.C., "Calculation of HLB Values of Non-Ionic Surfactants" Amer. Perf. & Essential Oil Review, May 1955, pp. 26–29.
Handbook of Chem. and Phys., The Chemical Rubber Co., Cleveland, 1968, p. c–439.
Netherlands Application No. 71,10985 to Imperial Chemical Industries Ltd., Feb. 15, 1972.

Primary Examiner—Benjamin R. Padgett
Assistant Examiner—Deborah L. Kyle
Attorney, Agent, or Firm—Cushman, Darby & Cushman

[57] ABSTRACT

Actinide metal microspheres are washed with an aqueous solution of a hydrophilic surfactant having an HLB value greater than 10 and up to about 14 to remove water soluble salts therefrom and any water immiscible organic liquids adhering to the microspheres according to the process disclosed. The microspheres are prepared by dispersing an aqueous phase of the appropriate actinide metal oxide into an immiscible organic liquid in the presence of ammonia or an ammonia releasing agent under solidification conditions to form the microspheres. Uranyl nitrate and anion-deficient uranyl nitrate solutions are preferred. Improved results are obtained when the organic liquid contains a complementary lipophilic surfactant having a HLB value of no more than about 10.

10 Claims, No Drawings

PROCESS FOR ELUTION OF ACTINIDE METAL MICROSPHERES

CROSS REFERENCE TO RELATED APPLICATIONS

This is a continuation-in-part of my earlier application Ser. No. 284,063 filed Aug. 28, 1972, now abandoned.

BACKGROUND OF THE INVENTION

The present invention relates to an improved process of washing spherical particles, for example sol-gel spheres of uranium, to remove the organic layer adhering to such spheres with an aqueous solution of a surface active substance.

In the preparation of metal and metal oxide spheres such as uranium and the salts thereof, a customary technique to form substantially spherical particles is to disperse an aqueous metal sol into an organic phase, such as kerosene or carbon tetrachloride, such that under dispersing conditions the aqueous phase droplets solidify in the organic phase, the aqueous phase being substantially or completely immiscible with the organic phase. The dispersed droplets of the sol become spherical in shape due to their inherent surface tension in the dispersed state within the immiscible organic liquid. The spheres so produced usually have an organic film adhering to the outside surface of the sphere and it is to the removal of this film that the present invention is directed.

It should also be mentioned that during the sphere formation in the organic liquid it has been proposed to add a surfactant to the organic liquid itself in order to prevent the aqueous-phase droplets from coalescing with each other and to maintain the droplets in the dispersed state. This procedure is described in U.S. Pat. No. 3,586,742.

In both instances it is usually necessary to wash the spheres with water to remove soluble salts of the gel or hydroxide material that are formed along with the spherical particles.

Previous procedures to accomplish the above objectives include the following: After globule or spherical particle formation in a relatively viscous organic phase, the particles were separated and washed with petroleum ether and subsequently eluted with a watery phase. In some cases residues of petroleum ether caused problems. For this reason, washing with petroleum ether was sometimes followed by a re-rinsing operation with methanol. After washing with methanol, the final washing operation, in this case, was performed with a watery rinsing phase. It will be apparent then that this procedure is not only difficult but adds to the cost of manufacture.

Another process that has been proposed is regeneration of the organic phase. Forming oils can in some cases be regenerated by contacting the oil with an adsorbing bed, the adsorbing bed collecting decomposition products of the oil. Decomposition products of the forming oil have in the past sometimes continued adhering to the globules, thus interfering with the elution.

DETAILED DESCRIPTION OF THE INVENTION

The present invention provides an improved washing or elution using an aqueous phase wash solution to rinse inorganic gel or hydroxide grains. According to the present invention a small quantity, say about 0.3 vol.%, of a surface active agent, somewhat hydrophilic in character and having an HLB number between about 10.0 and 14, is added to the aqueous washing solution. Using this washing solution the water-soluble salts contained in the spheres are removed as nitrates and chlorides during the washing operation. Further the film of organic liquid that may adhere to the spheres is also removed by the washing operation.

The spherical particles prepared according to the present invention are usually used as fuels or fuel elements in nuclear reactors and are composed of actinide metals and oxides thereof including uranium dioxide, uranium trioxide, thorium dioxide, plutonium dioxide, plutonium trioxide, zirconium dioxide, beryllium oxide and yttrium oxide, and mixtures thereof from which dense metal microspheres can be prepared. Optionally the microspheres contain carbon, usually collodial carbon, which, following heating and processing conditions known in the art, convert the particles to dense metal carbide microspheres.

Prior to the washing process of the present invention the spheres are prepared by dispersing a metal oxide in the form of droplets of a sol of the desired materials, then causing the particles to gel in situ by contact with a gelling agent, usually an ammonia-releasing agent or ammonia itself. The sol may be dispersed directly into an organic liquid of the type described which also contains ammonia, or an ammonia releasing agent — usually hexamethylene tetramine — is added to the sol prior to dispersion and gelation. The organic liquid is maintained at a temperature sufficiently high to cause the ammonia to react or be released, as the case may be. The spherical particle formation process is generally well known in the art and is described in the following U.S. Patents, the disclosures of which are incorporated by reference to the extent required to further explain and describe the present invention: U.S. Pat. Nos. 3,290,122; 3,312,632; 3,331,898; 3,586,742; 3,617,585; 3,669,632; and 3,709,963. The specific manner in which the spheres are prepared is not critical to successful subsequent processing and washing of the spheres, so long as the above general procedures are followed. It is preferred that metal salt solutions or anion-deficient metal salt solutions of the type described be mixed with one or more ammonia releasing agents prior to dispersion in the organic phase.

According to the present invention suitable ammonia-releasing agents include urea, hexamethylene tetramine, ammonium carbonate, potassium cyanate, ammonium cyanate, acetamide, formamide, and the like. After mixing the metal salt solution with ammonia-releasing agent, it is preferable to cool the mixed liquids prior to dispersion. It is also possible to maintain a predetermined concentration of ammonia or ammonia-releasing agent in the organic liquid itself such as passing gaseous ammonia through the liquid.

The aqueous liquid which is dispersed in the organic liquid contains actinide components if grains of nuclear fissional material are to be prepared. In order to improve the properties of the final products, the aqueous liquid which contains actinide components of the type described may also contain components of the elements $Zr^4$, $Hf^4$, $Y^3$, $Sc^3$ and trivalent rare earth elements.

An aqueous liquid which is particularly suitable for dispersion consists of an aqueous solution consisting essentially of uranyl nitrate or anion-deficient uranyl nitrate and the rinsing liquid is composed of water, surfactant and aqueous annonia.

As previously mentioned, surfactants have been included in the organic liquid to prevent the particles from coalescing together; see U.S. Pat. No. 3,586,742. We have found that further improved results are obtained if the surfactant used in the organic liquid and the surfactant used in the aqueous washing liquid bear a relationship to each other, such that the surfactant or surface active substance in the organic liquid is lipophilic in character, that is having an HLB number ranging between 7 and 10.5, and the surfactant or surface active substance used in the aqueous washing liquid is hydrophilic in character, that is having an HLB of about 10.0 to 14. As used herein and as recognized in the literature, the term "HLB" refers to hydrophile-lipophile balance.

A suitable combination of surfactants is as follows:

organic liquid — one or more alkyl substituted benzenes having up to about 12 carbon atoms in the alkyl chain. Dobane Pt-12 is a suitable material containing a mixture of alkyl benzenes having an average of about 12 carbon atoms in the alkyl chain and sold by Shell.

Another preferred surfactant is based on a polyoxyethylene sorbitol fatty acid or sorbitan ester - alkyl aryl sulphonate blend, such as Atlox 3386 and Atlox 3335, commercially available from Atlas Chemical Industries. Atlox 3386 has an HLB value of 9.6 and Atlox 3335 has an HLB value of 13.0.

The amount of surfactant added to the washing liquid depends upon a large number of factors including the nature of the impurities to be washed out, the type of surfactant, or if a combination of one or more surfactants is used, surfactants, the presence of other materials in the washing solution such as ammonia, the nature of the organic film to be removed if any, and the like. Usually, however, the process is conducted at a surfactant concentration within the limits of about 0.005 to 5 vol percent, calculated on the volume of wash solution employed, and preferably about 0.2 to 1 vol percent, although amounts as low as 0.01 percent by volume may be used.

There are a number of surface active agents or surfactants suitable for use in the process of the present invention. Surfactants generally available include the following:

1. Water-soluble salts of sulfuric acid esters of aliphatic alcohols containing from 8 to 18 carbon atoms, and particularly from 12 to 14 carbon atoms. Typical examples of such detergents are the sulfates of higher aliphatic alcohols derived from coconut oil, palm kernel oil, or babassu oil, in the form of their sodium or other water-soluble salts. Such detergents are disclosed, for example, in U.S. Pat. Nos. 1,968,793; 1,968,794; and 1,968,797.

2. Water-soluble salts of sulfuric acid esters of aliphatic polyhydric alcohols incompletely esterified with fatty acids containing from 8 to 22 carbon atoms and particularly from 10 to 14 carbon atoms. Typical examples of such detergents are the mono-sulfates of lauric acid (or coconut oil fatty acid) monoglyceride (sodium salt); mono-sulfate of the lauric acid ester of diethylene glycol (sodium salt); and mono-sulfate of the myristic acid ester of diglycerol (sodium salt). These detergents are disclosed in detail in U.S. Reissue Pat. No. 20,636.

3. Water-soluble salts of alkylated aromatic sulfonic acids wherein the alkyl group contains a chain of from 8 to 22 carbon atoms and particularly where the alkyl chain contains predominantly 12 to 14 carbon atoms. Typical examples of such compounds are the sodium salts of an alkylated benzene sulfonic acid wherein the alkyl group contains approximately 12 carbon atoms and is derived from an olefin polymer such as a propylene tetramer or is derived from a kerosene fraction; the sodium salt of nonyl naphthalene sulfonic acid; and the sodium salt of dodecyl toluene sulfonic acid. Such detergents are disclosed in a large number of U.S. patents typical of which are the following: U.S. Pat. Nos. 1,992,160; 2,161,173; 2,220,099; 2,232,117; 2,232,118; 2,233,408; and 2,283,199.

4. Water-soluble salts of higher molecular weight alkylated aromatic hydroxy-alkyl sulfuric acid esters wherein the higher molecular weight alkyl radical contains from 8 to 22 carbon atoms and more particularly from 10 to 14 carbon atoms. The higher molecular weight alkyl radical is derived from petroleum hydrocarbons, such as special cuts of kerosene, as well as from olefin polymers such as have been described, for example, hereinabove.

5. Sulfated and sulfonated vegetable oils (including mixtures of such sulfated and sulfonated oils). These are conventionally prepared from castor oil, olive oil, or oils containing glycerides of oleic acid by reaction with sulfuric acid or other sulfonating agents and then neutralizing. They are utilized in shampoos of the type which are, generally speaking, non-foaming, but they may be utilized in combination with detergents of the foaming type such as are described herein.

6. Condensation products of hydroxyalkyl amines with fatty acids containing from 8 to 18 carbon atoms and wherein the molar ratio of the hydroxy-alkyl amine to the fatty acid is not substantially less than 2 to 1. Typical examples of such detergents are condensation products of 2 mols of diethanolamine with 1 mol of lauric acid or coconut oil mixed fatty acids; and condensation products of 2 mols of triethanolamine with 1 mol of lauric acid, myristic acid, or coconut oil mixed fatty acids. These detergents are particularly described in U.S. Pat. No. 2,089,212.

7. Polyoxyalkylene glycol ethers of alkylated aromatic compounds in which the nuclear alkyl group contains from 8 to 18 carbon atoms and more particularly from about 10 to 14 carbon atoms.

Of course mixtures of one or more surfactants from the same class or from the various different classes 1-7 may be employed. As previously indicated the surfactant used in the aqueous washing liquid has an HLB value of the order of about 10.0 to about 14, making the surfactant hydrophilic in character. According to a preferred embodiment of the invention a lipophilic surfactant, that is a surfactant having an HLB value of about 7 and about 10.5, but preferably less than 10.0, is used in the organic liquid.

The present invention will be further illustrated by way of the following example:

EXAMPLE

In the manner of copending application Ser. No. 284,061 of Votocek, a mixture of a nitrate deficient uranyl nitrate solution and a solution of both hexamethylene tetramine and urea was sprayed in air over a liquid sold under the name Dobane PT-12 by Shell Nederland N.V. Dobane PT-12 is identified as a mixture of one or more alkyl substituted benzenes having in its alkyl chain an average number of 12 carbon atoms. To the Dobane PT-12 was added a quantity of 0.2 percent by volume of Atlox 3386. Atlox 3386 is a surface active substance based on a poly oxyethylene sorbitol fatty acids — alkyl aryl sulphonate blend having a HLB number of 9.6. Atlox 3386 is sold by Atlas Chemical Industries. As the alkyl benzene mixture was heated to about 100° C, solidification of the droplets sprayed into the organic liquid occurred due to the decomposition of the hexamethylene tetramine (hexa) and the urea into ammonia. The conditions of this example were as follows:

Concentration of nitrate deficient uranyl nitrate solution 3 molar. ratio of nitrate ions to uranyl ions 1.5 - 1.6, in other words $NO_3l/UO_2$ is between 1.5 and 1.6. Concentration of hexamethylene tetramine and urea both 3 molar.

Mixing ratio: Volume of uranyl solution/volume of 3 M hexa + 3 M urea = 1/1.4 to 1/1.5

Temperature of the mixture before dispersion: 2° to −5° C. Temperature of the alkyl substituted benzenes mixture: 93°–96° C.

After solidification the droplets were separated from the organic liquid and washed out with water of which the pH was adjusted to a pH of 9 or higher by the addition of ammonia solution which contained a 0.2 percent by volume of Atlox 3335. Atlox 3335 is a surface active substance based on a poly oxy ethylene sorbitan ester of fatty and resin acids — alkyl aryl sulphonate blend having a HLB number of 13.0. Atlox 3335 is marketed by Atlas Chemical Industries. Practical concentrations of Atlox 3335 range between 0.2 and 1 percent by volume.

What is claimed is:

1. In a process for the preparation of microspheres of an actinide metal oxide or actinide metal salt including dispersing an aqueous metal oxide or salt phase, or an aqueous metal oxide phase additionally containing carbon, onto an immiscible organic liquid under conditions such that the dispersed droplets are solidified into solid microspheres and separating the thus produced solid microspheres with some organic liquid adhering thereto, the improvement of removing said organic liquid from said microspheres comprising, in combination 1. providing said organic liquid with a lipophilic surfactant therein having an HLB value from about 7 to less than about 10.0 and
2. washing the thus separated microspheres with an aqueous solution containing a solubilizing amount of a hydrophilic surface active agent having a HLB value of at least 10.0 up to about 14.

2. The process as claimed in claim 1 wherein said organic liquid is composed of at least one alkyl substituted benzene having 8-20 carbon atoms in its alkyl chain.

3. The process as claimed in claim 1 wherein said aqueous washing solution contains a blend of alkyl aryl sulphonates and polyoxyethylene sorbitan esters of fatty and resin acids as said hydrophilic surface active agent.

4. The process as claimed in claim 1 wherein said organic liquid contains a particle dispersing amount of a blend of polyoxyethylene sorbitol fatty acids and alkyl aryl sulphonates as said lipophilic surface active agent.

5. The process as claimed in claim 1 wherein said aqueous metal oxide or salt phase is selected from the group consisting of actinide metal hydroxide sols, actinide metal salt solutions, anion deficient metal salt solutions and mixtures thereof.

6. The process as claimed in claim 5 wherein said aqueous metal oxide or salt phase additionally contains colloidal carbon distributed throughout said phase.

7. The process as claimed in claim 5 wherein said aqueous metal oxide or salt phase additionally contains at least one ammonia liberating agent.

8. The process as claimed in claim 1 wherein said organic liquid contains ammonia or an ammonia liberating agent.

9. The process as claimed in claim 1 wherein said aqueous metal oxide or salt phase contains at least one actinide metal and at least one element selected from the group consisting of $Zr^{+4}$, $Hf^{+4}$, $Y^{+3}$, $Sc^{+3}$ and rare earth elements admixed with said actinide metal oxide.

10. The process as claimed in claim 1 wherein said aqueous metal oxide or salt phase is selected from the group consisting of uranyl nitrate and anion-deficient uranyl nitrate.

* * * * *